Patented Feb. 13, 1945

2,369,355

UNITED STATES PATENT OFFICE 2,369,355

DYESTUFFS

John David Kendall and John Raymond Majer, Ilford, England, assignors to Ilford Limited, Ilford, Essex, England, a company of Great Britain No Drawing. Application August 6, 1942, Serial No. 453,807. In Great Britain September 1, 1941

13 Claims. (Cl. 260—240)

This invention relates to the production of dyestuffs and particularly to the production of dyestuffs capable of sensitising silver halide photographic emulsions.

According to the present invention dyestuffs are obtained by reacting, in the presence of a strong base, a compound of the general Formula I

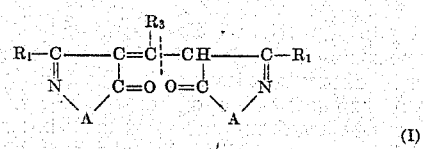

(where $R_1$ is a hydrogen atom or a monovalent substituent atom or group,
A is an oxygen atom or an

group (wherein $R_2$ is a hydrogen atom, a hydrocarbon group or a heterocyclic group), and $R_3$ is a hydrogen atom or an alkyl or aralkyl group)

with an alkyl or aralkyl quaternary salt of a heterocyclic nitrogen compound containing an external reactive methylene group in the α or γ position to the heterocyclic quaternary nitrogen atom, or with a corresponding heterocyclic nitrogen base obtainable by elimination from such quaternary salt of a hydrogen atom from said methylene group and the acid residue.

The expression "methylene" group is to be understood to include a methyl group which may be written —CH$_2$—H, and a mono-alkyl- or mono-aralkyl-substituted methyl group which may be written —CH$_2$R$_4$, where R$_4$ is an alkyl or aralkyl group.

It appears that during the reaction which takes place the compound of general Formula I splits at the position indicated by the vertical dotted line resulting in the formation of a dyestuff of the general Formula II

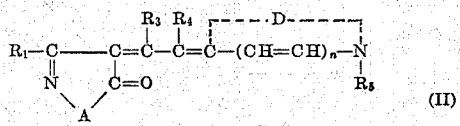

(where $R_1$, $R_2$ and $R_3$ and A have the meanings assigned to them above, $R_4$ is a hydrogen atom or an alkyl or aralkyl group, $R_5$ is an alkyl or aralkyl group, D is the residue of a heterocyclic nitrogen nucleus and $n$ is nought or 1). The pyrazole-5-one or isoxazolone residue which is split away combines with one of the hydrogen atoms of the reactive methylene group at its 4-position and separates. Where a heterocyclic nitrogen quaternary salt is used, a second hydrogen atom of the reactive methylene group combines with the acid salt-forming residue and splits away, but this does not occur where a heterocyclic nitrogen base is used.

Compounds of the general Formula I may be prepared by any known methods. A very convenient method of preparing such compounds in which $R_3$ is a hydrogen atom is by heating a suitable pyrazolone or isoxazolone derivative containing an unsubstituted intracyclic methylene group in the 4-position with formic acid. An alternative method consists in heating a suitable pyrazolone or isoxazolone derivative containing an unsubstituted intra-cyclic methylene group in the 4-position with ethyl-o-formate though this latter compound is a more expensive reagent. A convenient method of preparing compounds of general Formula I where $R_3$ is other than a hydrogen atom consists in heating a suitable pyrazolone or isoxazolone derivative containing an unsubstituted intracyclic methylene group in the 4-position with an appropriate ortho ester of a monocarboxylic acid in the presence of the anhydride of such monocarboxylic acid. Examples of such ortho esters are the esters of ortho-acetic acid, ortho-propionic acid and ortho-benzoic acid. Preferably the ethyl ortho-esters are employed but other alkyl ortho-esters, or aryl or aralkyl ortho-esters, may be employed if desired.

The groups $R_1$, $R_2$, $R_3$ and $R_4$ may variously be alkyl, aryl, aralkyl or heterocyclic groups as defined above. Preferably, where such groups are other than hydrogen atoms they are lower alkyl groups, e. g., methyl, ethyl, propyl or butyl groups though they may be higher alkyl groups if desired. Suitable aryl groups are phenyl and naphthyl groups, suitable aralkyl groups are benzyl and naphthyl-methyl groups and examples of suitable heterocyclic groups are the furyl and thienyl groups. Any of the groups referred to above may contain substituent radicles, e. g., hydroxy or amino groups. The group $R_5$, as indicated above, may be an alkyl or aralkyl group, for example, any of those referred to above. $R_1$ may be a monovalent atom or group other than those listed above, e. g., it may be a carbalkoxy or carbalkoxy-alkyl group.

The alkyl or aralkyl quaternary salt of a hetero-cyclic nitrogen compound employed may be any of those commonly employed in the manufacture of cyanine dyestuffs. Examples are the substituted and unsubstituted thiazoles, thiazolines, oxazoles, oxazolines, selenazoles, selenazolines, pyridine, quinoline, indolenine, diazines (e. g., pyrimidine), thio-diazoles and quinazoline and the corresponding substituted or unsubstituted polycyclic compounds such as benzthiazoles, naphthathiazoles and anthrathiazoles and also the diazines described in specification No.

425,609. The quaternary salt employed may be, for example, a chloride, bromide, iodide, sulphate or perchlorate. Preferably, however, an alkyl or aralkyl-p-toluene sulphonate, e. g., methyl or ethyl-p-toluene sulphonate is employed.

The reaction is effected in the presence of a strong base, i. e., a base stronger than ammonia. Suitable organic bases are those having an association exponent (pKab value at 25° C.) greater than 9.37, for example, diethylamine, triethylamine and piperidine. Inorganic bases may also be employed, e. g., sodium acetate. Preferably the reaction is effected in the presence of a solvent for the reactants, e. g., ethyl alcohol.

The following examples illustrate the invention but are not to be regarded as limiting it:

EXAMPLE I

*Preparation of 1-phenyl-3-acetic ester-4-(1.3.3-trimethyl-dihydro-indolylidene) ethylidene-5-pyrazolone*

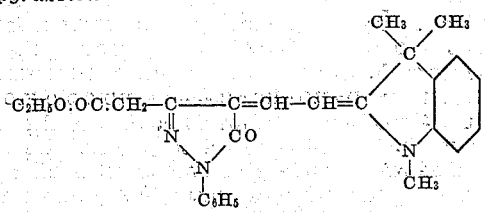

2.16 gms. of methenyl-bis - (1 - phenyl - 3 - acetic ester-5-pyrazolone) and 1.5 gms. of 2.3.3-trimethyl indolenine methiodide were dissolved in 15 ccs. of ethyl alcohol and brought to boiling point. 1 cc. of triethylamine was then added and the mixture boiled for 2 hours. On cooling, the above dyestuff crystallised out as red crystals melting at 190° C.

EXAMPLE II

*Preparation of 1-β-naphthyl-3-acetic ester-4-(1.3.3-trimethyl - dihydro - indolylidene) ethylidene-5-pyrazolone*

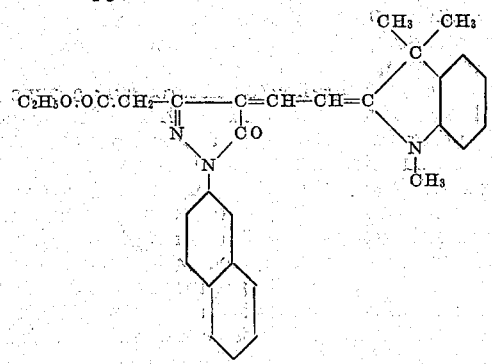

This dyestuff was prepared by the process of Example I using 2.68 gms. of methenyl-bis-(1-β-naphthyl-3-acetic ester-5-pyrazolone) and was obtained as crystals melting at 150° C.

EXAMPLE III

*Preparation of 1-phenyl-3-methyl-4-(N-methyl-dihydrobenzoxazolylidene) ethylidene-5-pyrazolone*

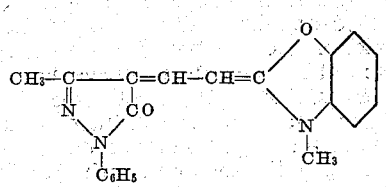

1.33 gms. of 1-methyl benzoxazole and 1.86 gms. of methyl-p-toluene sulphonate were mixed together and fused for three hours at 130° C. To the cooled product was added 3.6 gms. of methenyl bis-(1-phenyl-3-methyl-5-pyrazolone) and 30 ccs. of ethyl alcohol. The mixture was boiled, 2 ccs. of triethylamine were added and the mixture was then boiled for 6 hours. The resulting solution was filtered while hot and the filtrate allowed to cool, whereupon the above dyestuff separated as orange plates with a golden sheen melting at 175° C.

EXAMPLE IV

*Preparation of 1-phenyl-3-methyl-4-(N - ethyl-dihydro - benzselenazolylidene) ethylidene - 5 - pyrazolone*

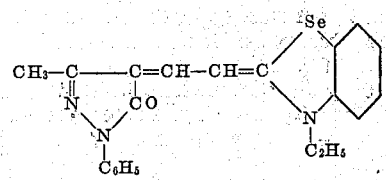

1 gm. of methenyl bis-(1 - phenyl - 3 - methyl-5-pyrazolone) and 1 gm. of 1-methyl benzselenazole ethiodide were dissolved in 15 ccs. of ethyl alcohol and brought to boiling point. 0.7 ccs. of triethylamine were then added and the mixture boiled for 3 hours. On cooling, the above dyestuff crystallised out and after recrystallisation from methyl alcohol solution it was obtained as orange crystals with a gold reflex, melting at 160° C.

EXAMPLE V

*Preparation of 1-phenyl-3-methyl-4-(N-methyl-dihydroquinolylidene) ethylidene-5-pyrazolone*

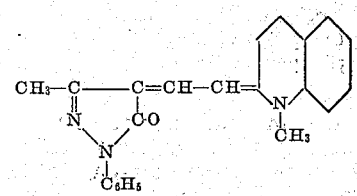

1.8 gms. of methenyl bis-(1-phenyl-3-methyl-5-pyrazolone) and 1.4 gms. of quinaldine methiodide were dissolved in 15 ccs. of ethyl alcohol and brought to boiling point. 1 cc. of diethylamine was added and the mixture boiled for 2 hours. The resulting solution was cooled, and diluted with water. On standing overnight the dyestuff separated as green needles, melting at 90° C. It was noted that the dye was very soluble in most organic solvents.

EXAMPLE VI

*Preparation of 1-phenyl-3-methyl-4-(N-methyl-dihydro-indolylidene) ethylidene-5-pyrazolone*

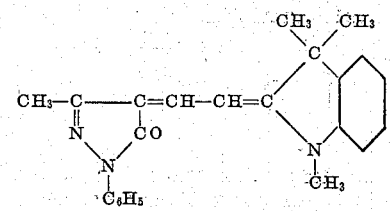

3.6 gms. of methenyl bis-(1-phenyl-3-methyl-5-pyrazolone) and 3.0 gms. of 2.3.3 - trimethyl indolenine methiodide were dissolved in 30 ccs. of ethyl alcohol and brought to boiling. 2 ccs. of triethylamine were added and the mixture boiled for one hour. On cooling, the dyestuff separated from the solution as red crystals melting at 184° C.

Example VII

*Preparation of 1-phenyl-3-methyl-4-(N-ethyl-dihydro-benz thiazolylidene) ethylidene-5-pyrazolone*

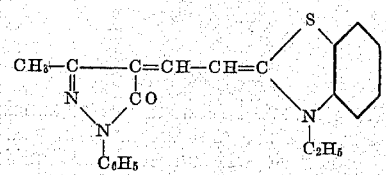

The process of Example VI was repeated using 3.0 gms. of 1-methyl benzthiazole ethiodide instead of the indolenine compound. The product was obtained as red crystals melting at 210° C.

Example VIII

*Preparation of 3-methyl-4-(1.3.3-trimethyl-dihydro-indolylidene) ethylidene-5-pyrazolone*

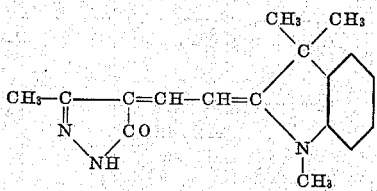

1 gm. methenyl bis-(3-methyl-5-pyrazolone) and 1.5 gms. of 2.3.3-trimethyl indolenine methiodide were dissolved in 30 ccs. of ethyl alcohol and brought to boiling. 3 ccs. of triethylamine were added and the mixture boiled for 6 hours. The resulting solution was filtered while hot and then allowed to cool. From the cool solution the above dyestuff separated as a pink solid melting at 240° C.

Example IX

*Preparation of 1-phenyl-3-carbethoxy-4-(1.3.3-trimethyl-dihydro-indolylidene) ethylidene-5-pyrazolone*

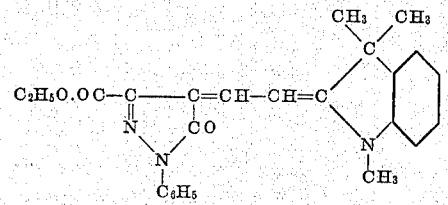

1.16 gms. of methenyl bis-(1-phenyl-3-carbethoxy-5-pyrazolone) and 1.5 gms. of 2.3.3-trimethyl indolenine methiodide were dissolved in 30 ccs. of ethyl alcohol and heated to boiling. 1 cc. of triethylamine was added and the mixture was then boiled for 3 hours. On cooling the above dyestuff separated as brick red crystals melting at 208° C.

Example X

*Preparation of 1-phenyl-3-methyl-4-(N-methyl-dihydrobenz - thiazolylidene) - propylidene-5-pyrazolone*

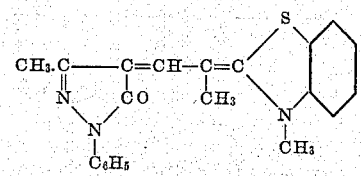

1.62 gms. of 1-ethylbenzthiazole and 1.86 gms. of methyl-p-toluene sulphonate were fused for three hours at 130° C., 3.6 gms. of methenyl-bis-(1-phenyl-3-methyl-5-pyrazolone) were then added and the mixture dissolved in 30 ccs. of ethyl alcohol. The mixture was then boiled and there was added 0.5 gm. of metallic sodium in 10 ccs. of ethyl alcohol. The whole mixture was then boiled for 4 hours and the sodium toluene sulphonate formed was filtered off and the solution cooled. The dyestuff separated from the filtrate as orange solid melting at 171° C.

Example XI

*Preparation of 1-phenyl-3-methyl-4-(N-methyl-dihydrobenzthiazolylidene) - isopropylidene-5-pyrazolone*

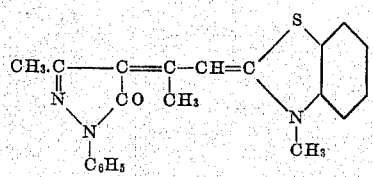

1.5 gms. of 1-methylbenzthiazole methiodide and 1.9 gms. of methyl methenyl-bis-(1-phenyl-3-methyl-5-pyrazolone) were dissolved in 30 ccs. of ethyl alcohol and the solution brought to boiling point. 2 ccs. of triethylamine were then added and the mixture boiled for 4 hours. On cooling the dyestuff separated as an orange red solid melting at 260° C.

Example XII

*Preparation of 3-phenyl-4-(N - ethyl - dihydrobenzthiazolylidene) ethylidene-5-isoxazolone*

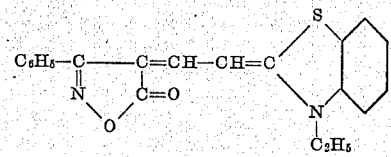

3.2 gms. of 3-phenyl isoxazolone, 1.4 gms. of ethyl-o-formate and 5 ccs. of acetic anhydride were mixed together and boiled for three hours. On cooling, methenyl-bis-3-phenyl isoxazolone crystallised out and was obtained as an orange solid melting at 186° C.

1.07 gms. of methenyl-bis-3-phenyl isoxazolone prepared as above, 0.96 gm. of 1-methylbenzthiazole ethiodide and 15 ccs. of ethyl alcohol were mixed together, boiled and 0.33 cc. of triethylamine was added. A yellow colour developed and the solution was boiled for 2½ hours when the desired dyestuff separated from solution. The dyestuff was removed by filtration and recrystallised from methyl alcohol solution. It consisted of pink needles melting at 264° C.

The dyestuffs produced according to the present invention are valuable sensitisers for silver halide photographic emulsions, e. g., gelatino-silver chloride, gelatino-silver bromide and gelatino-silver iodobromide emulsions and accordingly the present invention includes photographic silver halide emulsions containing such dyestuffs (alone or in admixture with other dyestuffs) and photographic elements carrying such emulsions.

What we claim is:

1. Process for the production of dyestuffs which comprises reacting, in the presence of a strong base, a compound of the general formula

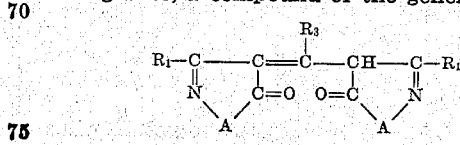

where $R_1$ is selected from the class consisting of the hydrogen atom and monovalent substituent groups, A is selected from the class consisting of the oxygen atom and the

group wherein $R_2$ is selected from the class consisting of the hydrogen atom, and a hydrocarbon group and $R_3$ is selected from the class consisting of the hydrogen atom, alkyl and aralkyl groups with a compound selected from the class consisting of alkyl and aralkyl quaternary salts of heterocyclic nitrogen compounds containing an external reactive methylene group in one of the α and γ positions to the heterocyclic quaternary nitrogen atom, and the corresponding heterocyclic nitrogen bases obtained by elimination from said quaternary salts of the acid residue and a hydrogen atom from such reactive group.

2. Process for the production of dyestuffs which comprises reacting, in the presence of a strong base, a compound of the general formula

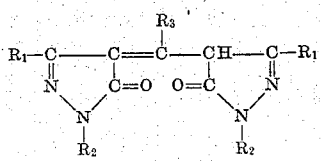

where $R_1$ is selected from the class consisting of the hydrogen atom and monovalent substituent groups, $R_2$ is selected from the class consisting of the hydrogen atom and a hydrocarbon group, and $R_3$ is selected from the class consisting of the hydrogen atom and alkyl and aralkyl groups, with a compound selected from the class consisting of alkyl and aralkyl quaternary salts of heterocyclic nitrogen compounds containing an external reactive methylene group in one of the α and γ positions to the heterocyclic quaternary nitrogen atom and the corresponding heterocyclic nitrogen bases obtained by elimination from said quaternary salt of the acid residue and a hydrogen atom from such reactive group.

3. Process for the production of dyestuffs which comprises reacting in the presence of a base having an association exponent above 9.37, a compound of the general formula

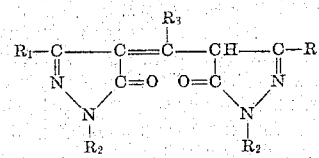

where $R_1$ is selected from the class consisting of the hydrogen atom and monovalent substituent groups, $R_2$ is selected from the class consisting of the hydrogen atom and a hydrocarbon group, and $R_3$ is selected from the class consisting of the hydrogen atom and alkyl and aralkyl groups, with a compound selected from the class consisting of alkyl and aralkyl quaternary salts of heterocyclic nitrogen compounds containing an external reactive methylene group in one of the α and γ positions to the heterocyclic quaternary nitrogen atom and the corresponding heterocyclic nitrogen bases obtained by elimination from said quaternary salts of the acid residue and a hydrogen atom from such reactive group.

4. Process for the production of dyestuffs which comprises reacting, in the presence of a strong base, a compound of the general formula

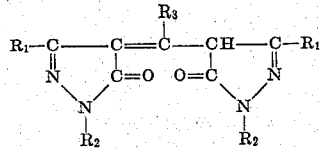

where $R_1$ is selected from the class consisting of the hydrogen atom and monovalent substituent groups, $R_2$ is selected from the class consisting of the hydrogen atom and hydrocarbon groups, and $R_3$ is selected from the class consisting of the hydrogen atom and alkyl and aralkyl groups with an alkyl quaternary salt of a heterocyclic nitrogen compound containing an external reactive methylene group in one of the α and γ positions to the heterocyclic quaternary nitrogen atom.

5. Process for the production of dyestuffs which comprises reacting, in the presence of a strong base, a compound of the general formula:

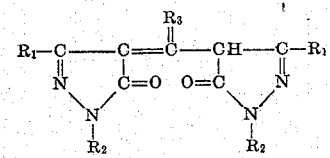

where $R_1$ is selected from the class consisting of the hydrogen atom and monovalent substituent groups, $R_2$ is selected from the class consisting of the hydrogen atom and hydrocarbon groups, and $R_3$ is selected from the class consisting of the hydrogen atom and alkyl and aralkyl groups with an alkyl quaternary salt of a polycyclic compound containing an azole nucleus and an external reactive methylene group in one of the α and γ positions to the quaternary nitrogen atom of said azole nucleus.

6. Process for the production of dyestuffs which comprises reacting, in the presence of a strong base, a compound of the general formula:

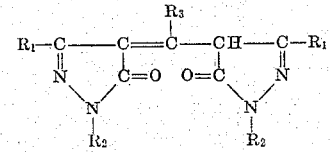

where $R_1$ is selected from the class consisting of the hydrogen atom and monovalent substituent groups, $R_2$ is selected from the class consisting of the hydrogen atom and a hydrocarbon group, and $R_3$ is selected from the class consisting of the hydrogen atom and alkyl and aralkyl groups, with an alkyl quaternary salt of a polycyclic compound containing an indole nucleus and an external reactive methylene group in one of the α and γ positions to the quaternary nitrogen atom of said indole nucleus.

7. Process for the production of dyestuffs which comprises reacting, in the presence of a strong base, a compound of the general formula:

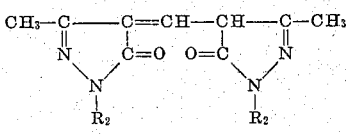

where $R_2$ is selected from the class consisting of the hydrogen atom and hydrocarbon groups, with an alkyl quaternary salt of a polycyclic compound containing an azole nucleus and an external reactive methylene group in one of the α and γ positions to the quaternary nitrogen atom of said azole nucleus.

8. Process for the production of dyestuffs which comprises reacting, in the presence of a strong base, a compound of the general formula:

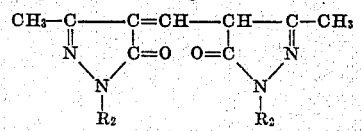

where $R_2$ is selected from the class consisting of the hydrogen atom and hydrocarbon groups, with an alkyl quaternary salt of a polycyclic compound containing an indole nucleus and an external reactive methylene group in one of the $\alpha$ and $\gamma$ positions to the quaternary nitrogen atom of said indole nucleus.

9. Process for the production of dyestuffs which comprises reacting, in the presence of a strong base, a compound of the general formula:

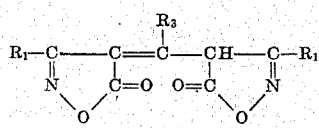

where $R_1$ is selected from the class consisting of the hydrogen atom and monovalent substituent groups, and $R_3$ is selected from the class consisting of the hydrogen atom, alkyl and aralkyl groups, with an alkyl quaternary salt of a polycyclic compound containing an azole nucleus and an external reactive methylene group in one of the $\alpha$ and $\gamma$ positions to the quaternary nitrogen atom of said azole nucleus.

10. Process for the production of dyestuffs which comprises reacting, in the presence of a strong base, a compound of the general formula

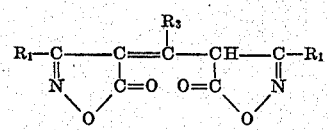

where $R_1$ is selected from the class consisting of the hydrogen atom and monovalent substituted groups, and $R_3$ is selected from the class consisting of the hydrogen atom, alkyl and aralkyl groups, with an alkyl quaternary salt of a polycyclic compound containing an indole nucleus and an external reactive methylene group in one of the $\alpha$ and $\gamma$ positions to the quaternary nitrogen atom of said indole nucleus.

11. A process for the production of dyestuffs which comprises reacting, by heating in the presence of a strong base, methenyl bis-(1-phenyl-3-methyl-5-pyrazolone) with 1-methyl benzselenazole ethiodide and recovering a dyestuff.

12. A process for the production of dyestuffs which comprises reacting, by heating in the presence of a strong base, methenyl bis-(1-phenyl-3-methyl-5-pyrazolone) with 2,3,3-trimethyl indolenine methiodide and recovering a dyestuff.

13. A process for the production of dyestuffs which comprises reacting, by heating in the presence of a strong base, methenyl bis-(1-phenyl-3-methyl-5-pyrazolone) with 1-methyl benzthiazole ethiodide and recovering a dyestuff.

JOHN DAVID KENDALL.
JOHN RAYMOND MAJER.